United States Patent Office.

MAURICE CERESOLE, OF LUDWIGSHAFEN-ON-THE-RHINE, BAVARIA, GERMANY, ASSIGNOR TO THE BADISCHE ANILIN AND SODA FABRIK.

PRODUCTION OF NEW RED COLORING-MATTER.

SPECIFICATION forming part of Letters Patent No. 377,349, dated January 31, 1888.

Application filed November 17, 1887. Serial No. 255,401. (Specimens.)

*To all whom it may concern:*

Be it known that I, MAURICE CERESOLE, Doctor of Philosophy, a citizen of the Swiss Republic, residing at Ludwigshafen-on-the-Rhine, in the Kingdom of Bavaria and Empire of Germany, have invented new and useful Improvements in the Manufacture of a Red Coloring-Matter or Dye-Stuff, of which the following is a specification.

My invention relates to the manufacture of a red coloring-matter or dye-stuff belonging to a new class of phthaleines discovered by me, and produced by the condensation of one molecule of phthalic anhydride or of its halogen substitution products with two molecules of meta amidophenol or of its alkyl derivatives. The said new class of phthaleines comprises within itself a series of coloring-matters capable of producing various shades of red in dyeing and printing, and differing from the phthaleines hitherto in use by their basic character. I therefore apply to this series of coloring-matters the generic name of "rhodamines."

The red coloring-matter or dye-stuff which forms the subject-matter of my present application for Letters Patent is an alkylized rhodamine produced by the condensation of one molecule of phthalic anhydride with two molecules of dimethyl-meta-amidophenol. The said dimethyl-meta amidophenol—a hitherto unknown alkyl derivative of the known meta-amidophenol—may be obtained from the latter by the ordinary methods of methylizing amido compounds. For instance, a mixture of one part, by weight, of the hydrochlorate of meta-amidophenol with about three parts, by weight, of methylic alcohol is heated in a closed digester during eight hours at a temperature of about 170° centigrade. The excess of methylic alcohol having been recovered by distillation, the residuary hydrochlorate of dimethyl-meta-amidophenol is then decomposed by carbonate of soda, and the phenolic body thus set free is extracted with ether. The ether is distilled off and the crude dimethyl-meta amidophenol thus obtained is purified by crystallization from boiling ligroine or from other suitable solvents. In its pure state dimethyl-meta-amidophenol is a white crystalline solid fusing at 86° centigrade.

In carrying out my invention I take about ten parts, by weight, of the before-mentioned dimethyl-meta-amidophenol and mix the same with about twelve parts, by weight, of phthalic anhydride. The mixture is then heated in an enameled digester provided with an agitator and fitted up within an oil bath, the temperature of which is kept at about 175° centigrade, during from four to five hours, or until the contents of the vessel solidify into a crystalline melt possessing a dark-green metallic appearance and dissolving in alcohol with a rich crimson color. Throughout this operation the access of air, which would otherwise tend to deteriorate the product, ought to be prevented as much as possible. The melt thus produced is then allowed to cool and reduced to powder. Its principal constituent is the phthalate of my new coloring-matter, which may be obtained in a pure and well-crystallized condition by dissolving the melt in boiling alcohol and setting the solution aside to crystallize. As, however, the said phthalate is almost insoluble in water, and therefore necessitates the use of alcohol as a solvent for dyeing purposes, I prefer to convert my coloring-matter into the more convenient mercantile form of a hydrochlorate soluble in water, and I proceed as follows:

The finely-powdered melt produced from ten parts, by weight, of dimethyl-meta-amidophenol, as above described, is agitated during several hours and at a temperature of about 20° centigrade with weak caustic ammonia—say with a mixture of one hundred and sixty parts of water with ten parts, by weight, of caustic ammonia - liquor containing about eighteen per cent. of $NH_3$. The base of the coloring-matter thus set free is afterward extracted by repeated shakings with benzine, and from the benzolic extracts thus obtained its hydrochlorate may then be withdrawn by agitation with the requisite amount of hot and dilute hydrochloric acid. The aqueous solutions are separated from the supernatant layer of benzine and allowed to cool. The hydrochlorate of my new coloring-matter will then be deposited in small glittering needle-shaped crystals.

The red coloring-matter or dye-stuff prepared as above described presents the following characteristic properties: The composition of the free rhodamine base (dried at 100° centigrade) corresponds to the formula $C_{20}H_{10}O_3N_2Me_4$. This compound may therefore be termed "tetramethyl-rhodamine." It has the character of an aromatic tertiary amine, capable of forming mostly well-defined and crystallizable salts with mineral and organic acids, from the solutions of which it can be separated in a crystalline condition by the addition of caustic alkalies or ammonia. It is almost insoluble in water, but readily soluble in alcohol, and less so in benzine and ether. The solutions in the two latter solvents are colorless; but upon addition of a dilute mineral or organic acid the rich crimson color of the corresponding saline compounds of tetramethyl-rhodamine thus formed is immediately developed. The alcoholic solution of the free base is red and strongly fluorescent.

The above-described crystallized hydrochlorate of tetramethyl-rhodamine contains one molecule of hydrochloric acid. It is readily soluble in pure water with an intense crimson color. The diluted aqueous solution exhibits a brilliant orange-yellow fluorescence. Hydrochloric acid, when added in small quantity to a moderately-strong solution, quickly causes the coloring-matter to separate out in small crystals, which, when suspended in the liquid, transmit the light, according to their state of division, with a purple or blue color. A large excess of strong hydrochloric acid turns the solution scarlety red or orange. Concentrated sulphuric acid dissolves the coloring-matter with a yellow color. An aqueous solution of the dye-stuff gets rapidly discolorized upon being treated with caustic ammonia and zinc dust in the cold. The color, however, immediately reappears as soon as a drop of red prussiate-of-potash liquor is added to the colorless solution. Tetramethyl-rhodamine imparts very pure tints, varying from pink to crimson, both to animal and vegetable textile fiber. Silk and wool are dyed without the aid of a mordant in a neutral dye-bath or in a bath slightly acidulated with acetic acid. The shades thus obtained rival those which may be dyed with the brightest and bluest varieties of the eosine class of phthaleines; but they surpass the latter so far as regards resistance to air and light.

Cotton which has received a tannin mordant may be dyed with my basic coloring-matter after the manner practiced for dyeing basic aniline colors. The shades thus obtainable are somewhat bluer and duller than those produced upon animal fiber.

What I claim as new, and desire to secure by Letters Patent, is—

As a new product, the red coloring-matter or dye-stuff (tetramethyl-rhodamine) hereinbefore described and having the characteristics above set forth.

In testimony whereof I have hereunto set my hand in the presence of two subscribing witnesses.

MAURICE CERESOLE.

Witnesses:
HEINRICH CARO,
FERDINAND PFEIFFER.